United States Patent [19]

Ballu

[11] Patent Number: 4,982,898
[45] Date of Patent: Jan. 8, 1991

[54] DEVICE FOR PROJECTING A TREATMENT PRODUCT ONTO PLANTS

[75] Inventor: Patrick J. M. Ballu, Reims, France

[73] Assignee: Tecnoma, Epernay, France

[21] Appl. No.: 461,289

[22] Filed: Jan. 5, 1990

[30] Foreign Application Priority Data

Jan. 6, 1989 [FR] France ............................ 89 00100
Jul. 4, 1989 [FR] France ............................ 89 08958

[51] Int. Cl.⁵ ............................................. B05B 7/00
[52] U.S. Cl. .................................. 239/77; 239/655; 239/164; 239/176; 239/292; 239/295
[58] Field of Search ............... 239/77, 150, 151, 164, 239/172, 176, 292, 295, 300, 654, 655

[56] References Cited

U.S. PATENT DOCUMENTS 4,927,080 5/1990 Alsing ........................... 239/77

Primary Examiner—Andres Kashnikow
Assistant Examiner—Lesley Morris
Attorney, Agent, or Firm—Watson, Cole, Grindle & Watson

[57] ABSTRACT

Device for simultaneously projecting onto plants one or more jets of particles or droplets of a treatment product and a stream of air for facilitating the displacement of the particles or droplets, and comprising a frame carrying substantially vertical slideways along which can slide, on the one hand, a boom carrying a row of atomization means and pressurized air pipes having suitably oriented passages, and on the other hand, separately, a fan feeding the said pipes and connected thereto by a deformable hose, or a connector of adjustable length.

10 Claims, 6 Drawing Sheets

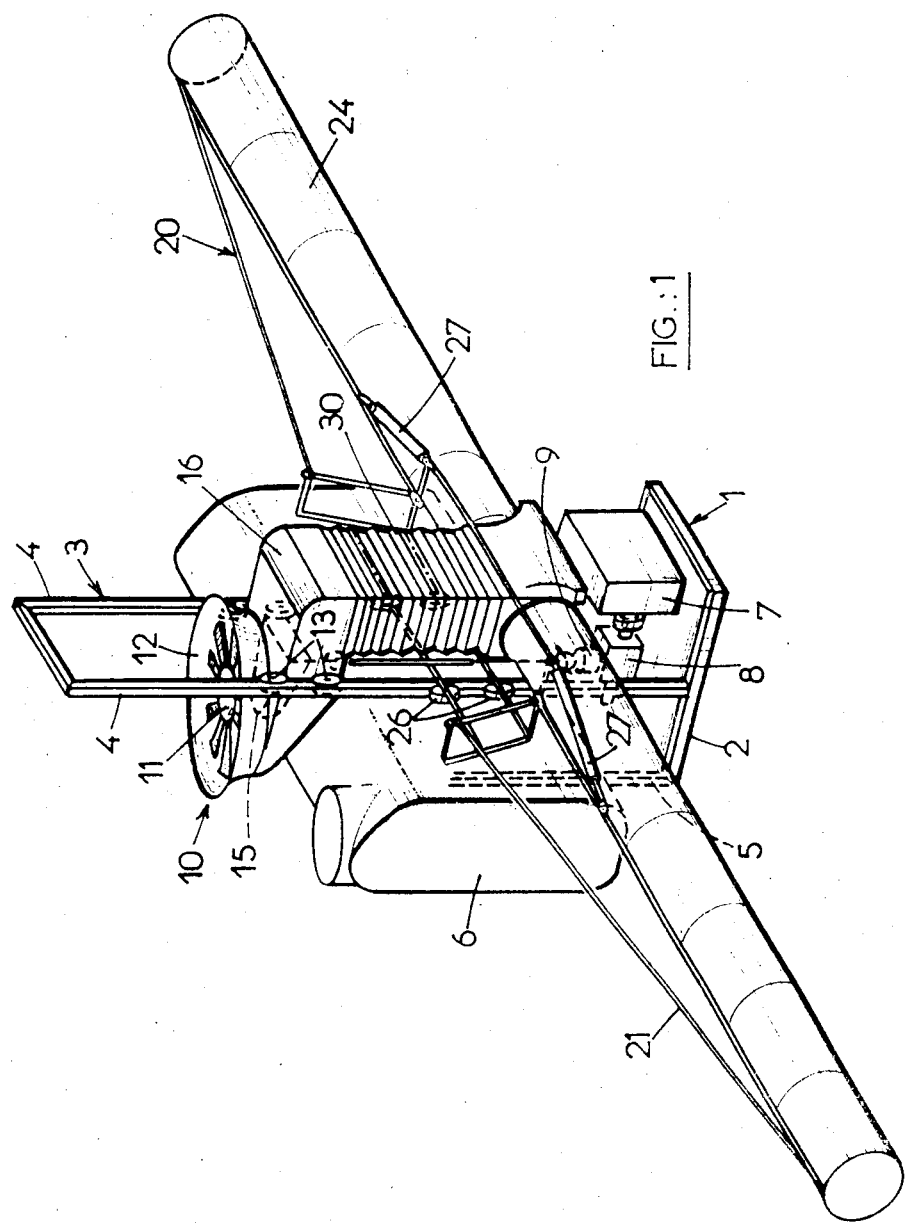
FIG.:1

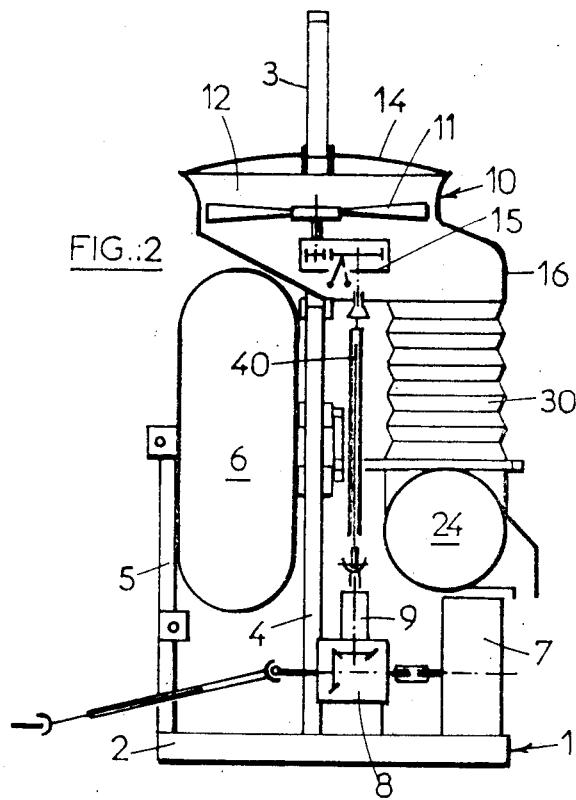
FIG.:2
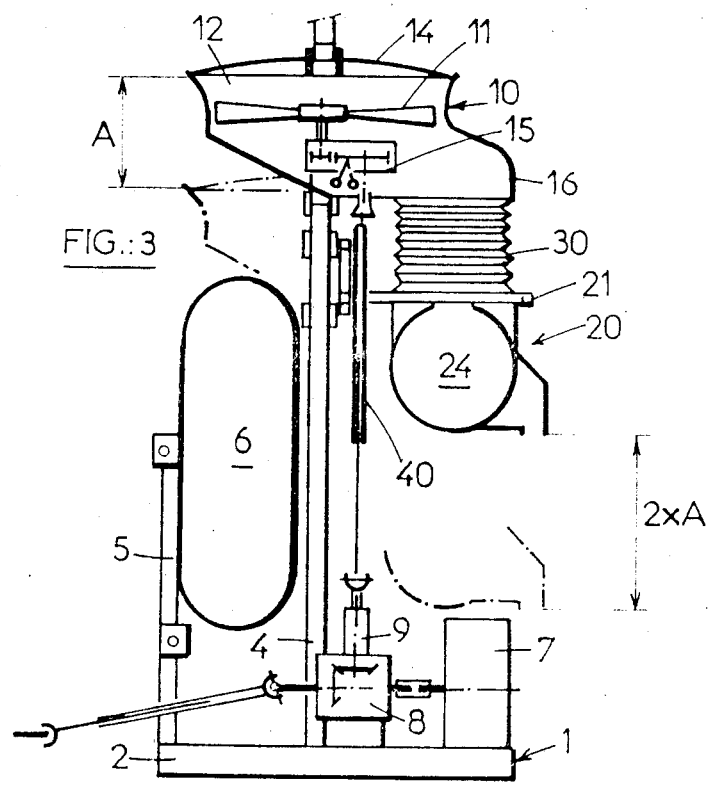
FIG.:3

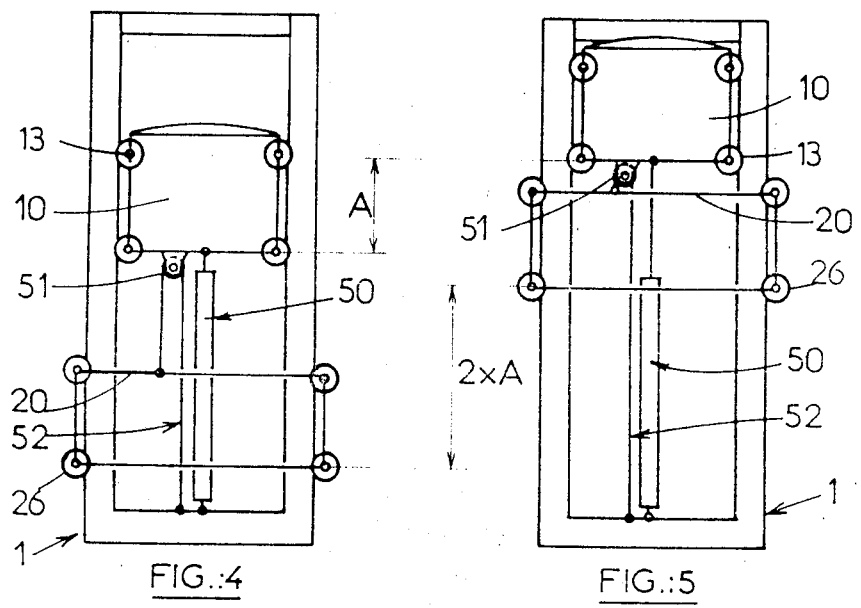
FIG.:4    FIG.:5
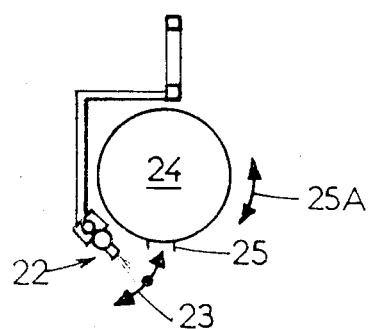
FIG.:6

FIG.: 7
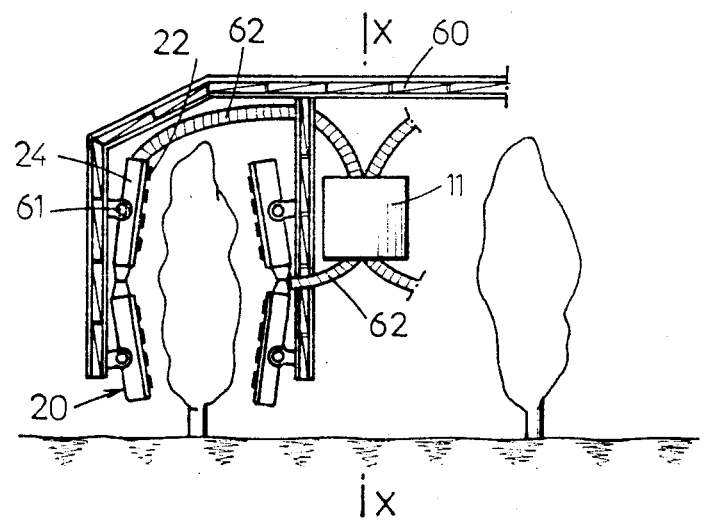
FIG.: 8
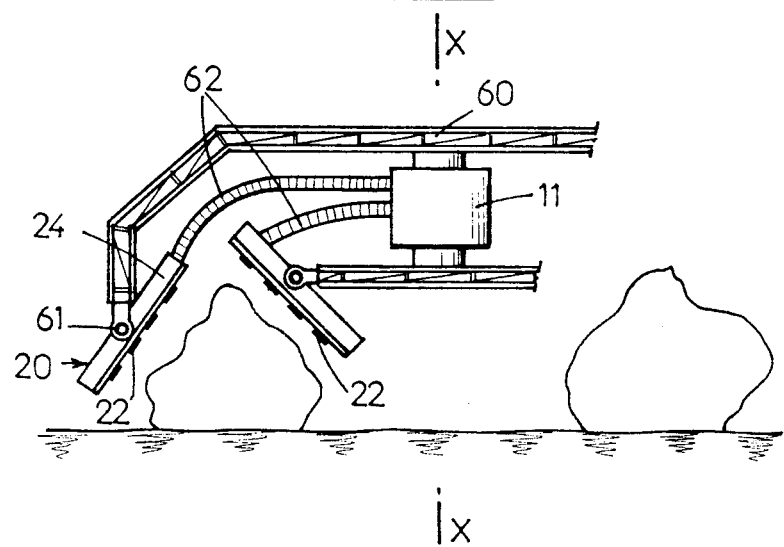

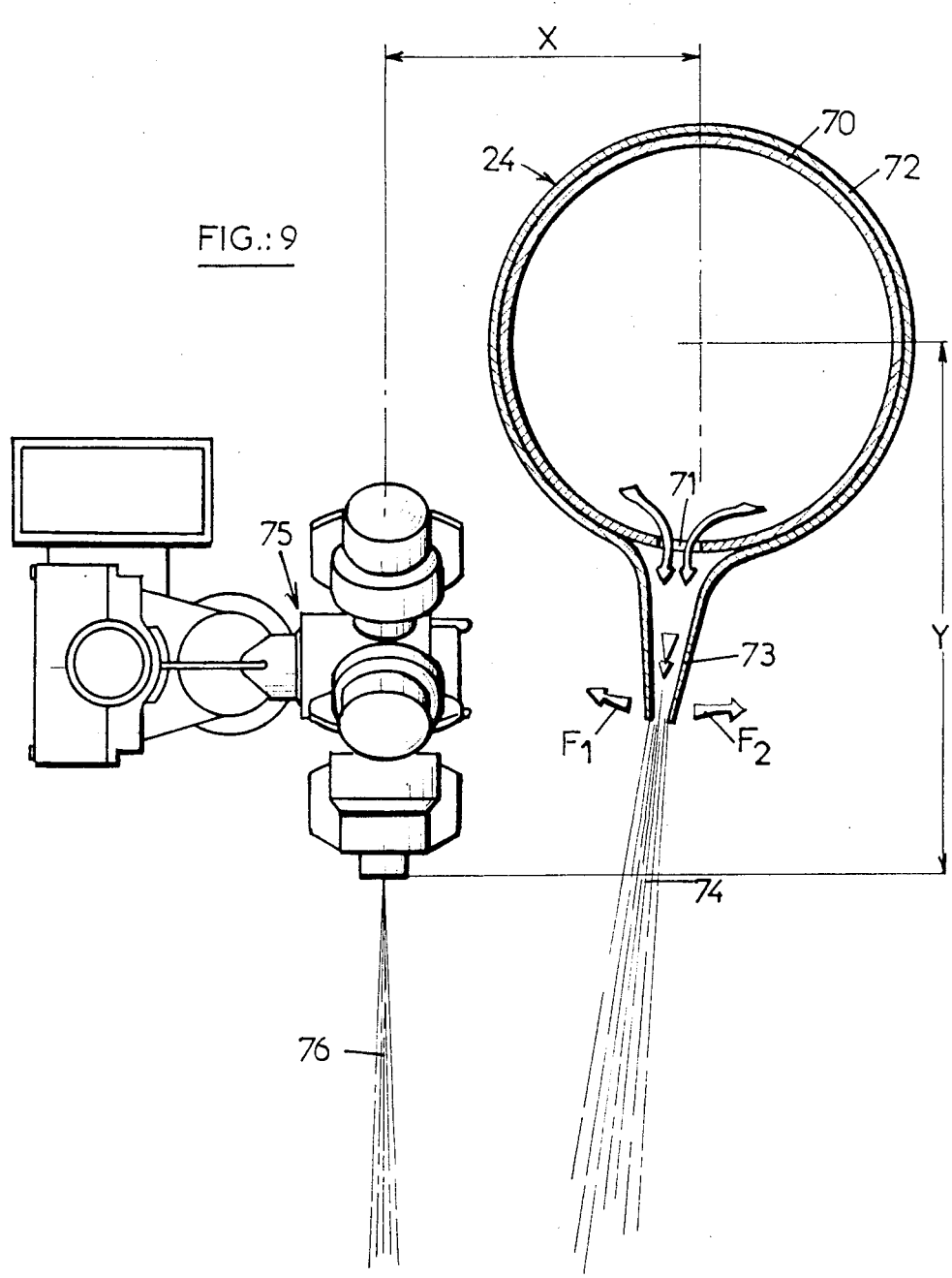
FIG.: 9

DEVICE FOR PROJECTING A TREATMENT PRODUCT ONTO PLANTS

STATE OF THE ART

The present invention relates to a method and a device for projecting a treatment product onto plants.

For several years there has been an observable tendency for plant treatment products to be used in a concentrated form—powdered solid or high-strength liquid—rather than in the form of a dilute solution.

The treatment product is projected by means of a regulating nozzle to which it is sent under high pressure, or by means of a device comprising a rotating member such as that described in Patent No. EP-A-0,055,948 in the name of the applicant company. This latter device produces atomization in a planar surface and the use of a plurality of devices of the same type mounted on a single boom makes it possible to produce a planar sheet of substantial surface area. If regulating nozzles are used, it is likewise possible to obtain a planar sheet by providing a series of nozzles aligned and oriented in a single plane, these nozzles preferably being of the flatjet type. It is thus possible to treat large surfaces rapidly.

These systems, however, exhibit a number of disadvantages: these fine particles or droplets rapidly lose their initial velocity and are carried away by the wind or by the air displaced by movement, and fail to reach their target. If the plants to be treated form part of a tall, dense crop, the boom passing above them means that only their upper part can be treated effectively.

Plant treatment devices are also known, for example from French Patent Nos. 2,215,361 in the name of Nicolas S. A. and 2,506,349 in the name of Tecnoma, which comprise a blower capable of generating a stream of air, and means, such as a nozzle, for introducing a treatment liquid into the stream of air. In Australian Patent No. 449,843, a device is described which operates on the same principle and which, in order to make it possible to treat plant growth at different heights, possesses a series of blowers mounted on a mast. The latter is pivotably mounted and can be folded down, for transport, into a substantially horizontal position. The blowers each comprise a fan driven by a hydraulic motor fed with fluid under pressure through pipes which form part of the mast. A treatment liquid diffusion chamber is placed in the centre of the fan. This document envisages means for the discontinuous adjustment of the height of the blowers by virtue of a series of holes provided in masts, in which holes fixing screws can be placed. These devices make it possible to direct the treatment product more satisfactorily towards the objective, by virtue of the fact that the initial velocity of the droplets is maintained or increased by the effect of the velocity of the stream. However, these devices, which may be intended for the treatment of arborescent plants, such as fruit trees or vines, produce a cylindro-conical jet of mist and not a planar sheet. The fact that the nozzles have to be situated within the stream of air necessarily means that the latter has a not insignificant thickness. If this is not so, even a slight deviation of the nozzle relative to the center of the stream of air would entail irregular distribution. For this reason, there can be no hope of creating an effective apparatus by aligning a series of such devices, each of which would be of small size, on a boom. Moreover, the device of the above-mentioned Australian patent having a vertical mast would be very difficult to use with a boom having a certain transverse width.

A device has been proposed, specifically in European Patent No. 0,272,740 in the name of Van Den Munckhof, which possesses a boom carrying a series of atomization means arranged in a row in order to form a planar sheet of particles or droplets of the treatment product, these atomization means being fed from a reservoir by means of at least one common pump and feed pipes, the said boom further bearing a sleeve for air under pressure provided with passages oriented so as to produce a stream of air in sheet form, this sleeve being connected to a fan which can likewise slide along slideways, the arrangement of the passages being such that the said atomization means are external to the said stream of air, and that the latter forms an angle of less than 90° with the sheet of particles or droplets.

This arrangement permits better treatment of the mass of vegetation, permitting deeper penetration of the treatment product into the interior of this mass.

According to an embodiment described in the document which has just been mentioned, vertical adjustment is possible. For this purpose, a mobile supporting member which carries a horizontal boom, the reservoir and the treatment product pump, together with the fan, driven by means of a flexible transmission shaft, is able to slide on vertical slideways carried by a tractor. According to another embodiment, for the treatment of shrubs, a plurality of vertical booms are provided which are suspended from a fixed horizontal common beam.

The mobile supporting member, together with the elements which it supports, forms a heavy and bulky assembly which cannot be raised very high, particularly for reasons of safety, and which is suitable only for plants of low height.

In another embodiment described by the same document, for the treatment of plants forming rows of a certain height, a horizontal beam of fixed height carries a plurality of vertical booms, the sheets of particles and of air then being in vertical planes.

The object of the present invention is to provide a device which operates with sheets of particles assisted by streams of air in sheet form, which is extensively adjustable vertically, and possibly in orientation, and which is nevertheless simple and inexpensive.

SUMMARY OF THE INVENTION

In order to achieve this result, the invention provides a mobile device for treating plants, comprising a frame linked to a chassis and provided with substantially vertical slideways along which a boom or boom support can slide, the boom bearing a series of atomization means arranged in a row in order to form a planar sheet of particles or droplets of the treatment product, these atomization means being fed from a reservoir by means of at least one common pump and feed pipes, the said boom further bearing a sleeve for air under pressure provided with passages oriented so as to produce a stream of air in sheet form, this sleeve being connected to a fan which can likewise slide along the slideways, the arrangement of the passages being such that the said atomization means are external to the said stream of air, and that the latter forms an angle of less than 90° with the sheet of particles or droplets, in which the fan is mounted so as to be able to slide on the substantially vertical slideways without being fixed to the boom, and in that the said sleeve is connected to the fan by a deformable hose and/or a connector of adjustable length.

By virtue of the arrangement of the invention, the boom can be placed at the most suitable height for the characteristics of the plants to be treated, and the fan at the height which is most appropriate in view of the practical problems affecting its use.

A deformable hose is understood in particular to mean a hose of the "bellows" or telescopic type, and a connector of adjustable length is understood to mean in particular the provision of a plurality of connecting tubes of various lengths, which are interchangeable and are positioned as circumstances require.

Preferably, the device comprises a telescopic transmission shaft for driving the fan from a vertical-output countershaft situated in the lower part of the said frame. In this case, the fan is advantageously equipped with a step-up gear arranged in a fixed manner relative to the said fan.

Advantageously, the reservoir for the treatment product is arranged on one side of the frame, the fan being positioned at least partly on the same side of the frame and above the reservoir, while the boom is arranged on the opposite side of the frame, so that it can move over virtually the entire height of the latter. According to a useful embodiment, the fan is then arranged with its axis vertical.

According to another useful embodiment, the frame is equipped with a means for lifting the vertically positioned fan, and the boom is supported by a cable anchored to the frame and passing over a return pulley fixed to the fan, so that a vertical displacement of the fan entails a double amplitude displacement of the boom.

According to a first form of embodiment, the atomization means, similarly to the boom, are arranged in a horizontal row which is transverse relative to the displacement of the device over the ground. In this case, the boom may bear directly on rollers or runners for the purposes of sliding on the vertical slideways.

In another form of embodiment, the boom may be vertical or inclined, and in this case it is carried by a support of the beam type which itself bears the rollers or runners for sliding on the slideways. It is thus possible to provide a plurality of booms carried by a single horizontal support in order to allow the treatment of both sides of a row of plants forming a hedge. Advantageously, in the case where the boom is carried by a support, the boom is mounted on the support by an articulation which enables it to be oriented in a vertical plane transverse to the displacement, and the sleeve is connected to the fan by a flexible pipe.

According to an advantageous alternative embodiment, to enable the relative orientation of the stream of air and the sheet of particles to be varied in a simple manner, the air sleeve is formed by a tube of circular section which possesses a series of passages arranged along a generating line, and a shell of general cylindrical shape is mounted on the tube, capable of pivoting thereon, and possesses spouts which form nozzles for orienting the said stream of air. Preferably, in this case, the shell possesses a chamber situated between the tube and said spouts.

According to another form of embodiment, the sleeve takes the form of a flexible tube possessing a series of passages arranged along a generating line, and two dished metal sheets arranged on either side of the said passages and held to bear against the tube, when the latter is under pressure, by collars surrounding the tube, these metal sheets defining between them nozzles for orienting the jet of air.

BRIEF DESCRIPTION OF THE DRAWINGS

The invention will now be described in a more detailed manner with the aid of practical examples of embodiment, illustrated by the drawings, in which:

FIG. 1 is a perspective overall view of the device, in the lowered position,

FIG. 2 is a vertical longitudinal section through the same device, again in the lowered position, FIG. 3 is a section through the same device, in the raised position, FIGS. 4 and 5 are diagrams showing the arrangement of the means for raising the boom and the ventilator, FIG. 6 is a diagrammatic cross-section of the boom, outside the axial plane of symmetry, FIGS. 7 and 8 are partial diagrammatic views in elevation, from the rear, of two other types of device according to the invention.

FIGS. 9 to 11 are cross-sectional views of an air sleeve according to an alternative embodiment of the invention, FIG. 9 further showing the position of an atomization device positioned close by.

DETAILED DESCRIPTION OF THE INVENTION

Figure 11:
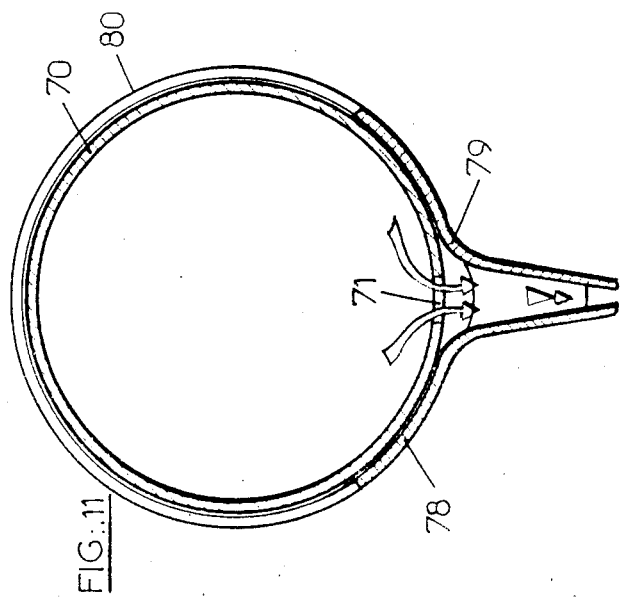
Figure 10:
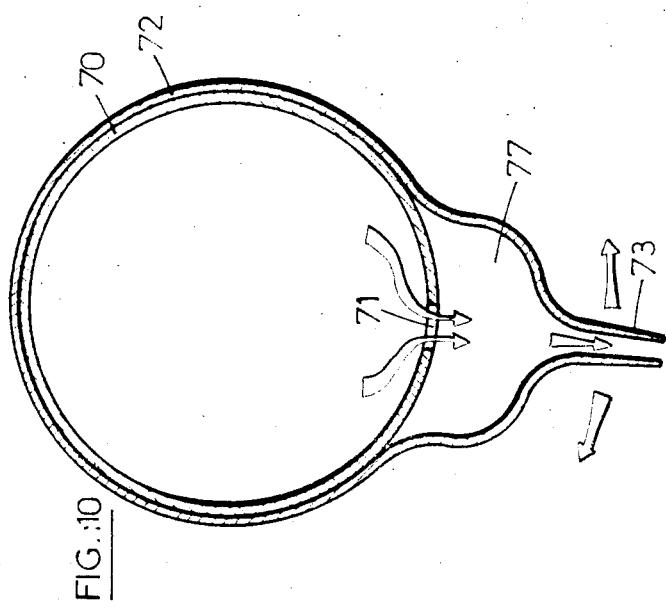

The device described by way of example may be considered as being formed from a plurality of assemblies which are generally mobile relative to one another.

It is possible to distinguish a chassis assembly 1, which comprises a horizontal chassis 2 formed of side rails and cross rails, which carries a vertical frame 3 whose uprights 4 form rails for rollers, as will be seen subsequently. The chassis 2 also carries supports 5 for a reservoir 6 intended to contain the liquid product to be atomized.

The chassis assembly 1 is provided with means, not shown, for fixing it to the "three-point" coupling device of a tractor. The chassis 2 carries an atomizing pump 7 connected to the power take-off of a tractor, not shown, via an angled countershaft 8 which possesses a vertical output 9.

The fan assembly, or turbine assembly 10, comprises a fan 11, having a vertical axis, placed at the center of a supporting member 12, which is provided with rollers 13 intended to roll on the uprights 4 of the frame 3. The air intake, provided with a protective grill 14, is directed upwards. The shaft of the fan is mounted on the output of a disengageable multi-ratio step-up gear 15. The supporting member 12 bearing the fan extends downwards as a sheath 16 for diverting the air flow in order to send it to the mobile duct which will be described below.

The boom assembly 20, which can be seen in FIG. 1, comprises a folding metal chassis 21, of known type, which carries on the one hand a series of atomization nozzles 22, which can be seen in FIG. 6, arranged to project a jet of liquid coming from the reservoir 6, pressurized in the pump 7, and carried by partly rigid and partly flexible pipes, not shown. The nozzles 22 can each be oriented in a vertical plane, as indicated by the arrows 23 in FIG. 6. The metal chassis 21 of the boom further carries an air sleeve 24 which extends over the length of the boom and which is provided with a series of regulating nozzles 25 for the air coming from the fan assembly 10. These regulating nozzles can be oriented by pivoting the sleeve 24 on its axis, in accordance with the arrows 25A.

The boom chassis 21 is provided with rollers 26 which enable it to slide along the uprights 4 of the frame 3.

Jacks 27 enable the framework 21 of the boom to be folded back along the tractor during movement away from the fields.

A deformable air pipe 30 connects the air sleeve 24 to the air pipe 16 situated at the exit from the fan assembly 10. This deformable pipe may be of the "bellows" type, as is shown in the figures. It may also be of the telescopic type, formed from a plurality of tubes fitting one into the other. In this case, the pipe 30 is advantageously articulated in its upper and lower parts, in order to compensate for any variations in the orientation of the boom relative to the frame 3.

A cardan transmission, arranged approximately vertically and provided with a telescopic shaft 40, connects the output 9 from the angled countershaft 8 to the input of the step-up gear 15 which controls the rotation of the fan 11.

FIGS. 4 and 5 show the arrangement of the lifting assembly of the boom and of the fan assembly. A vertical hydraulic jack 50 bears on the one hand on the chassis 1, and on the other hand on the fan assembly 10. Its length is approximately equal to half that of the frame 3, though this is not obligatory. The fan assembly 10, or more accurately its supporting member 12, carries a return pulley 51 for a cable 52, one end of which is hooked onto the chassis 1, and the opposite end of which supports the boom framework 20. It will be understood that the vertical displacements of the pulley 51, that is to say of the fan assembly 10, are of half the amplitude of that of the displacements of the boom 20.

In the lowered position, the boom is situated at a very short distance from the chassis 2, while the fan assembly 10 is approximately at mid-height on the frame 3. This has made it possible to position the reservoir 6 at the front of the frame 3, and at a short distance therefrom, while the axis of the fan is close to the plane of the said frame 3, so that the front part of the said fan overhangs the reservoir. The rear part of the fan, on the other hand, overhangs the boom and the telescopic air pipe 30. The arrangement of the fan with the axis vertical is not obligatory, but it possesses the advantage of allowing a saving of vertical space, particularly in the event of a helical fan such as that shown in the figures. However, the use of such a fan, arranged in this manner, is not obligatory. It is also possible to use, for example, a centrifugal fan. Whatever the case, the fan may also be arranged with its axis horizontal with its intake facing forwards in the direction of travel, that is to say towards the left in FIG. 1, or rearwards, or even obliquely, with its intake directed upwards and forwards or rearwards, which reduces the extent of the changes of direction imposed on the stream of air.

FIGS. 7 and 8 are diagrammatic views from the rear of booms of different shapes adapted to plants grown in rows and forming thin shrubs in the case of FIG. 7, and bushy plants in the case of FIG. 8.

FIG. 7 shows booms 20 bearing air sleeves 24 and rows of atomizing regulating nozzles 22 which are arranged almost vertically on either side of the row of plants. The booms 20 are carried by a support 60, and their orientation is adjustable by means of articulations 61. The air sleeves 24 are connected to the fan assembly 10 by flexible pipes 62, and the regulating nozzles 22 are likewise fed by means of flexible pipes (not shown).

FIG. 8 shows a similar structure, but the shape of the plants enables the air sleeves 24 and the regulating nozzle rows 22 to be placed with an orientation of approximately 45° to the vertical.

FIG. 9 relates to the means for obtaining the stream of air. A tube 70, of circular cross-section, forming the sleeve 24 possesses over its entire length a series of passages 71, arranged along a generating line. A shell 72, of general cylindrical shape, possesses spouts 73 which form nozzles for orienting the air jet 74. The shell 72 can rotate on the tube 70, following the arrows F1, F2, to vary the orientation of the nozzles 73 to a certain extent relative to the direction of the apertures 71.

FIG. 9 also shows a regulating nozzle 75, with its control valves, which is intended to produce a jet of particles 76. This is an apparatus of conventional type which it is unnecessary to describe in greater detail.

The device for producing the stream of air can move relative to the outlet of the nozzle 75, that is to say the start of the sheet 76, both in the horizontal direction X, parallel to the direction of travel, and in the vertical direction Y. The system can thus be readily adapted to different types of vegetation.

FIG. 10 shows an alternative embodiment of the device of FIG. 9, the special feature of which is that the shell 72 possesses, between the tube 70 and its passages 71, a chamber 77, which permits a greater angular clearance and stabilization of the turbulences.

FIG. 11 shows another alternative embodiment, in which the tube 70, instead of being rigid, is flexible and the shell 72 is reduced to two metal sheets 78, 79, of appropriate shape, retained by collars 80. The leak tightness between the metal sheets 78, 79 and flexible tube 70 is simply obtained by virtue of the pressure which inflates the said tube 70.

The arrangements described, by virtue of their very light weight, allow a further increase in the height at which it is possible to work without impairing safety.

I claim:

1. Mobile device for treating plants, comprising:

a chassis, a frame linked to said chassis and provided with substantially vertical slideways, a boom bearing a series of atomization means arranged in a row in order to form a planar sheet of particles or droplets of a treatment product, means for sliding the said boom or a support for the said boom along the said slideways, a reservoir for said treatment product, a pump and feed pipes for feeding the said atomization means, a sleeve for air under pressure carried by the said boom and provided with passages oriented so as to produce a stream of air in sheet form, the arrangement of the passages being such that said atomization means are external to the said stream of air, and that the latter forms an angle of less than 90° with the sheet of particles or droplets, a fan mounted so as to be able to slide on the substantially vertical slideways without being fixed to the boom, a deformable hose and/or a connector of adjustable length for connecting said fan to said sleeve.

2. Device as claimed in claim 1, which comprises a telescopic transmission shaft for driving the fan from a vertical-output countershaft situated in the lower part of said chassis.

3. Device as claimed in claim 2, wherein the fan is equipped with a step-up gear arranged in a fixed manner relative to the fan.

4. Device as claimed in one of claims 1 to 3, wherein said reservoir is provided on one side of the frame, and said fan is placed at least partly on the same side of the frame and above the reservoir, while the boom is arranged on the opposite side of the frame, so that it can move over virtually the entire height of the latter.

5. Device as claimed in claim 4, wherein the fan is arranged with its axis vertical.

6. Device as claimed in claim 1, wherein the frame is equipped with a jack for lifting the positioned fan vertically, and the boom is supported by a cable anchored to the frame and passing over a return pulley fixed to the fan, so that a vertical displacement of the fan entails a double amplitude displacement of the boom.

7. Device as claimed in claim 1 and possessing a support for at least one boom, wherein the boom is mounted on the support by an articulation which enables it to be oriented in a vertical plane, transverse to the displacement, and the sleeve is connected to the fan by a flexible pipe.

8. Device as claimed in claim 1, wherein the air sleeve is formed by a tube of circular section which possesses a series of passages arranged along a generating line, and a shell of general cylindrical shape is mounted on the tube, capable of pivoting thereon, and possesses spouts which form nozzles for orienting the said stream of air.

9. Device as claimed in claim 8, wherein the shell possesses a chamber situated between the tube and said spouts.

10. Device as claimed in claim 1, wherein the sleeve is formed by a flexible tube possessing a series of passages arranged along a generating line, and two dished metal sheets arranged on either side of the said passages and held to bear against the tube, when the latter is under pressure, by collars surrounding the tube, these metal sheets defining between them nozzles for orienting the jet of air.

* * * * *